United States Patent
Wang et al.

(10) Patent No.: US 11,923,793 B2
(45) Date of Patent: Mar. 5, 2024

(54) MOTOR-DRIVE WITH UNIVERSAL JUMPER CONFIGURATION

(71) Applicant: Rockwell Automation Technologies, Inc., Mayfield Heights, OH (US)

(72) Inventors: Xuechao Wang, Milwaukee, WI (US); Bora Novakovic, Thiensville, WI (US); Rangarajan M. Tallam, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 167 days.

(21) Appl. No.: 17/538,610

(22) Filed: Nov. 30, 2021

(65) Prior Publication Data

US 2022/0085745 A1    Mar. 17, 2022

Related U.S. Application Data (63) Continuation of application No. 16/258,371, filed on Jan. 25, 2019, now Pat. No. 11,218,105.

(51) Int. Cl.
   *H02P 27/06* (2006.01)
   *H02M 1/44* (2007.01)
   (Continued)

(52) U.S. Cl.
   CPC .............. *H02P 27/06* (2013.01); *H02M 1/44* (2013.01); *H02M 5/4585* (2013.01); *H02P 29/0241* (2016.02)

(58) Field of Classification Search
   CPC ...... H02P 27/06; H02P 29/0241; H02P 29/02; H02M 1/44; H02M 5/4585; H02M 1/008;
   (Continued)

(56) References Cited

U.S. PATENT DOCUMENTS 4,843,533 A * 6/1989 Roof .................... H02H 7/1216
                                                     361/111
6,271,638 B1   8/2001 Erdman
(Continued)

OTHER PUBLICATIONS

IEC 61800-5-1: Adjustable Speed Electrical Power Drive Systems—Part 5-1: Safety Requirements—Electrical, Thermal and Energy, edition 2.0, Jul. 16, 2007; 240 pages.
(Continued)

*Primary Examiner* — David Luo
(74) *Attorney, Agent, or Firm* — Fletcher Yoder, P.C.

(57) ABSTRACT

A motor-drive system may include a rectifier, a metal-oxide varistor (MOV) assembly, and an inverter. The rectifier may generate a direct current (DC) voltage based on a first voltage received from at least one supply voltage line coupled to a voltage source. The MOV assembly may include at least two metal-oxide varistors (MOVs) respectively coupled to the at least one supply voltage lines. The MOV assembly may couple between the voltage source and the rectifier. The motor-drive system may also include a permanently-installed jumper to couple at least one MOV of the at least two MOVs of the MOV assembly to a system ground. The inverter of the motor-drive system may convert the DC voltage to an alternating current (AC) voltage, which may be provided to a load of the motor-drive system.

20 Claims, 5 Drawing Sheets

(51) Int. Cl.
*H02M 5/458* (2006.01)
*H02P 29/024* (2016.01)

(58) Field of Classification Search
CPC ........ H02M 5/458; H02M 1/32; H02M 1/126; H01C 7/12; H01G 4/40
USPC .................. 318/400.22, 400.21, 400.01, 700
See application file for complete search history.

(56) References Cited

U.S. PATENT DOCUMENTS

| | | | |
|---|---|---|---|
| 6,616,415 | B1 | 9/2003 | Renken |
| 7,497,582 | B1 | 3/2009 | Savicki |
| 8,508,166 | B2 | 8/2013 | Marcinkiewicz |
| 9,788,378 | B2 | 10/2017 | Bendtsen |
| 9,800,188 | B2 | 10/2017 | Chretien |
| 10,447,026 | B2 | 10/2019 | Kostakis |
| 2009/0154034 | A1 | 6/2009 | Tallam |
| 2011/0211290 | A1 | 9/2011 | Fife |
| 2011/0222195 | A1 | 9/2011 | Benoit |
| 2012/0249038 | A1 | 10/2012 | Wei |
| 2014/0092514 | A1 | 4/2014 | Chen |
| 2016/0276821 | A1 | 9/2016 | Politis |
| 2017/0063260 | A1 | 3/2017 | Li |
| 2017/0302165 | A1 | 10/2017 | Marcinkiewicz |
| 2018/0254625 | A1 | 9/2018 | Packard |
| 2019/0393698 | A1 | 12/2019 | Joo |
| 2020/0014309 | A1 | 1/2020 | Mortensen |

OTHER PUBLICATIONS

IEC 61800-3: Adjustable speed electrical power drive systems—Part 3: EMC requirements and specific test methods; edition 3.0, Feb. 2017; 122 pages.

A. R. Strandt and R. M. Tallam, "Comprehensive analysis of drive performance when using a dc link choke vs. an input line reactor," 2015 IEEE Energy Conversion Congress and Exposition (ECCE), Montreal, QC, 2015, 8 pages.

R. M. Tallam, D. W. Schlegel and F. L. Hoadley, "Failure mode for AC drives on high resistance grounded systems," Twenty-First Annual IEEE Applied Power Electronics Conference and Exposition, 2006. APEC '06., Dallas, TX, 2006; 5 pages.

* cited by examiner

MOTOR-DRIVE WITH UNIVERSAL JUMPER CONFIGURATION

CROSS REFERENCE TO RELATED APPLICATIONS

This application claims priority from and the benefit of U.S. patent application Ser. No. 16/258,371, entitled "MOTOR-DRIVE WITH UNIVERSAL JUMPER CONFIGURATION," filed Jan. 25, 2019, which is hereby incorporated by reference in its entirety for all purposes.

BACKGROUND

This disclosure relates generally to systems and methods for grounding used within industrial automation systems. More specifically, the present disclosure discusses a universal grounding system for use in motor-drive system, which may be part of the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial automation system may include a variety of components associated with different types of motors and motor-drive configurations. For example, different motor-drive configurations may use different types of grounding systems to protect various electrical components connected to a motor-drive system from certain types of faults. To effectively maintain and operate a variety of types of motors in a number of different motor-drive configurations, each different type of motor-drive system may use a different a system ground voltage connection or arrangement based on particular protocols and/or procedures that may be defined for the respective type of motor-drive system. When these protocols and/or procedures are not followed in a suitable or sufficient matter, operation of the variety of motors and motor-drive systems may be compromised.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a system ground coupled to protective Earth ground and a voltage source configured to provide a first voltage. The system may also include a power converter coupled to the voltage source via two or more supply lines. The two or more supply lines may transmit the first voltage to the power converter. The power converter may convert the first voltage to a second voltage to be output on a direct current (DC) bus. The system may also include a metal-oxide varistor (MOV) assembly including at least two metal-oxide varistors (MOVs) that respectively couple to the two or more supply lines. The MOV assembly may couple between the voltage source and the power converter. The system may also include an electromagnetic compatibility (EMC) capacitor assembly coupled between the voltage source and the power converter. A permanent jumper may be used by the system to couple the MOV assembly to the system ground and a removable jumper may be used by the system to couple the EMC capacitor assembly to the system ground.

In another embodiment, a motor-drive system may include a rectifier, a metal-oxide varistor (MOV) assembly, and an inverter. The rectifier may generate a direct current (DC) voltage based on a first voltage received from at least one supply voltage line coupled to a voltage source. The MOV assembly may include at least two metal-oxide varistors (MOVs) respectively coupled to the at least one supply voltage lines. The MOV assembly may couple between the voltage source and the rectifier. The motor-drive system may also include a permanently-installed jumper to couple at least one MOV of the at least two MOVs of the MOV assembly to a system ground. The inverter of the motor-drive system may convert the DC voltage to an alternating current (AC) voltage, which may be provided to a load of the motor-drive system.

In yet another embodiment, a method may include placing a metal-oxide varistor (MOV) assembly into a drive enclosure and placing an electromagnetic compatibility (EMC) capacitor assembly into the drive enclosure. The method may also include coupling a permanent jumper between the MOV assembly and a system ground and coupling a removable jumper between the EMC capacitor assembly and the system ground.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this present disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward techniques for improving the operation of an industrial automation system, and specifically to improving the coupling method of electrical systems in a motor-drive system to a protective Earth or ground. In general, the ground coupling techniques described herein serve to protect an operator, to protect components within the motor-drive system, to improve operation of the industrial automation system overall, and to reduce electromagnetic emissions from the motor-drive system. In addition, by employing the techniques described herein, the motor drive system may be manufactured using a universal grounding jumper configuration that is suitable for use with a variety of ground systems. In this way, personnel tasked with commissioning a motor drive system does not jeopardize the integrity of the motor drive system regardless of the grounding system used for their respective electrical systems.

An example motor-drive system may include one or more components that are to be coupled to a ground to promote a suitable operation of a respective motor. The ground may be a protective Earth ground used to protect an operator from relatively high voltages associated with operation of the motor-drive system and/or help mitigate electromagnetic emissions from the motor-drive system. The ground may couple to the one or more components via a system ground associated with the one or more components. For example, the motor-drive system may include protective circuitry, such as one or more metal-oxide varistors (MOVs), and/or filtering circuitry, such as one or more electromagnetic compatibility (EMC) capacitors (e.g., sometimes referred to as electromagnetic capability (EMC) capacitors) that may be coupled to the system ground (and be coupled to the ground via the system ground after installation into an industrial automation system). The protective circuitry may provide the motor-drive system with some amount of surge protection, transient protection, or the like. In particular, the protective circuitry may use an EMC capacitor assembly as an electromagnetic interference (EMI) suppression filter network. The protective circuitry may be applied to power distribution systems or various types of electrical systems that use different grounding methods (e.g., solid grounded neutral, floating neutral and high-resistance grounded (HRG) neutral, or the like) to protect the respective components. However, depending on the particular grounding system employed in a particular location or operation, it may be desirable to provide a means to either connect and/or disconnect the filtering circuitry (e.g., EMI suppression filter networks, surge protection devices (SPD) networks) from ground in a particular arrangement. Indeed, the protective circuitry may not effectively protect the motor-drive system when coupled to ground in an unsuitable manner. That is, one grounding configuration of the motor drive system may not work with all types of system grounding, and the consequences of improper configuration may cause undesirable operation of the motor-drive systems that use the protective circuitry.

To elaborate, different types of motor-drive systems may have different grounding connection arrangements that enable the protective circuitry to operate effectively. For example, a wye-neutral grounded system may use a grounding connection that connects in a manner or pattern different from a high-resistance grounding system or a floating grounding system. Mismatching a grounding configuration (e.g., wye-neutral, high resistance grounding, floating) to a filtering circuitry configuration (e.g., arrangement may cause inefficient or undesirable operation of the motor-drive system. For example, voltage ratings of isolation components within the motor-drive system (or a load of the motor-drive system) may be exceeded, may cause degradation of insulation over time, or the like. As employed in conventional motor-drive systems, jumpers used to couple one or more protective circuitry of the motor-drive system to ground are completely removable.

In addition, certain filtering circuitry, such as the EMC capacitor assembly (e.g., EMI suppression networks), is particular sensitive to suitable coupling to ground. For example, when an EMI suppression network is coupled to ground on an HRG or floating systems, the power converter may operate in an unsuitable manner or stop operating following a ground fault. Furthermore, if the EMI suppression network is disconnected from ground on a solidly-grounded system, high over-voltages from a direct current (DC) bus to ground may occur within the motor-drive system. This may cause premature failure of insulation of circuitry, switch-mode power supply (SMPS) transformers, isolation components (e.g., optical-couplers), or the like. High voltages may occur at an output of a power converter (e.g., a rectifier) of the motor-drive system, which may result in unsuitable operation of the power converter. This may be addressed by placing a snubber capacitor at the output of the rectifier.

In this way, an operator of the conventional motor-drive system is expected to both correctly identify the type of motor-drive system that is being used within their motor-drive system in addition to correctly install a suitable combination of jumpers for the protective circuitry and/or for the filtering circuitry of the motor-drive system to connect to ground. Moreover, a suitable combination or arrangement of jumpers may change based on regulatory bodies defining what the suitable combination is for the type of motor-drive system, the type of loads present on the motor-drive system, and the like, therefore making what is suitable for the motor-drive system difficult for an operator to consistently determine and implement. Hence, no one configuration for EMI suppression filter networks may be suitable for different types of distribution system grounding. Motor-drive systems may be expensive systems central to an operation of an industrial automation system, therefore simple, straightforward, and infallible operation of the motor-drive system is generally desired.

With the foregoing in mind, the presently disclosed techniques describe a universal grounding configuration and method of manufacturing of a motor-drive system that serves to simplify installation and operation of protective circuitry of the motor-drive system. In particular, an MOV assembly and an EMC capacitor assembly (e.g., protective circuitry) are described herein as disposed between ground and an internal power structure of the motor-drive system. The MOV assembly and/or the EMC capacitor assembly may be included as protective circuitry for the motor-drive system and may respectively include the one or more MOVs and/or the one or more EMC capacitors. The line reactor may include one or more inductors coupled in series between a power converter device and the EMC capacitor assembly of the motor-drive system. As will be appreciated herein, by employing the embodiments of the universal grounding configuration described herein, the MOV assembly may be effective regardless of how one or more EMC capacitor assemblies are coupled to ground in the motor-drive system. In other words, this disclosure describes a motor-drive configuration with a universal grounding jumper configuration that enables an improved system for installation of jumpers (or removal of jumpers) based on the particular grounding system of the motor-drive system. In this way, degradation of insulation or inefficient operation of the motor-drive system is reduced or avoided and/or protection against over direct current (DC) voltage is improved (e.g., such as when used in relatively long motor cables). In some embodiments, a customer may desire EMI protection and may engage a removable jumper to provide optional EMI protection via an EMC capacitor assembly. In this way, certain regulatory standards may be able to be met by this improved configuration to motor-drive systems (e.g., such as certain European standards of industrial grounding configurations).

Figure 1:
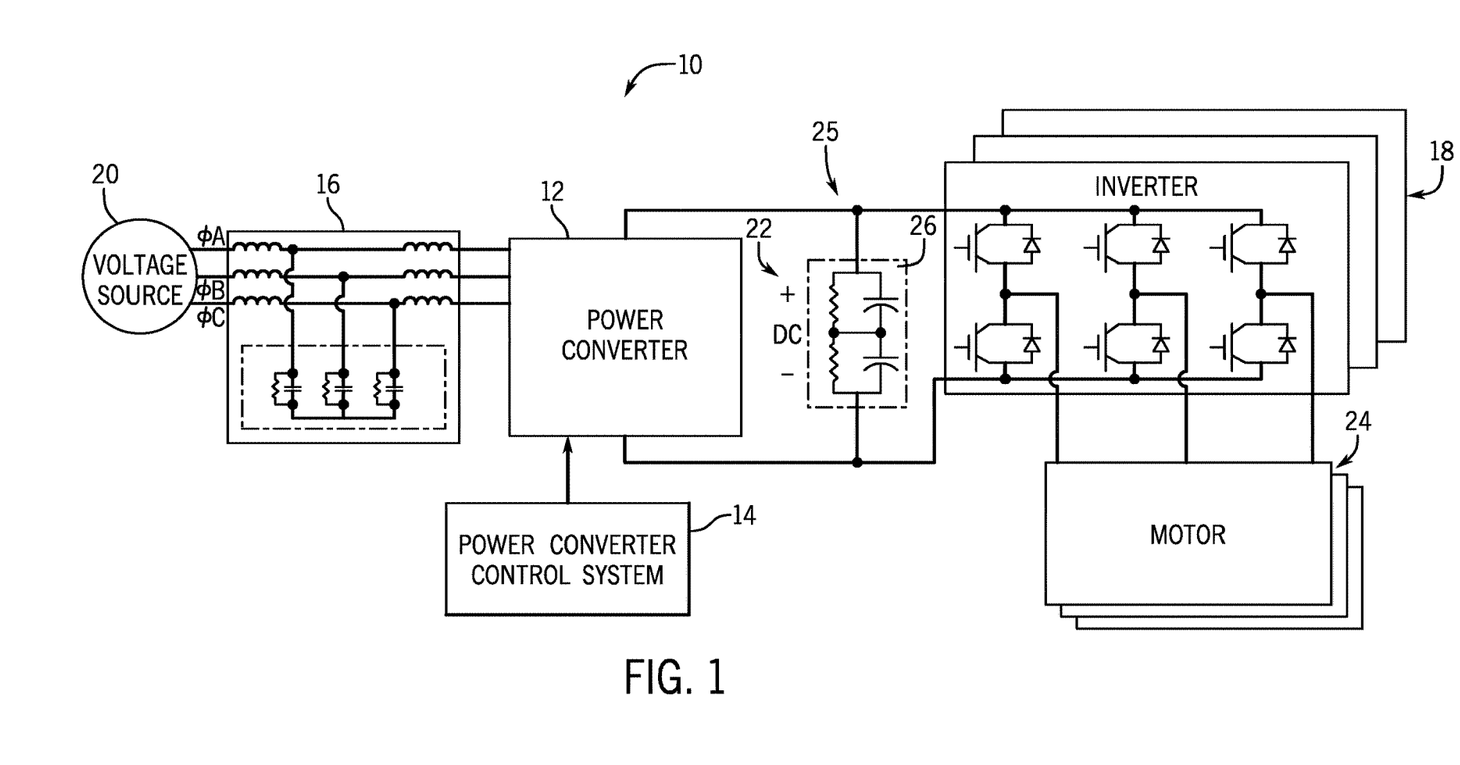
FIG. 1 is a block diagram of a motor-drive system associated with an industrial plant system, in accordance with an embodiment.

By way of introduction, FIG. 1 is a block diagram of a motor-drive system 10, which may be part of an industrial automation system. The motor-drive system 10 may include a power converter 12 and a power converter control system 14 that may control the operation of the power converter 12. The motor-drive system 10 may also include a filter 16 and one or more inverters 18. The filter 16 may filter the input alternating current (AC) voltage provided to the power converter 12, while the inverters 18 may convert the DC voltage output by the power converter 12 into a controllable AC voltage, as will be discussed below. In one embodiment, the filter 16 may be positioned between a voltage source 20 and the power converter 12 to reduce input harmonics that may have been caused by power conversion devices (e.g., thyristors, insulated-gate bipolar transistor (IGBT), diodes) switching in power converter 12.

In general, the power converter 12 may receive three-phase alternating current (AC) voltage from the voltage source 20 or a direct current (DC) voltage from the voltage source 20 and convert the AC voltage or DC voltage into a direct current (DC) voltage 22 suitable for powering a load (e.g., rectify a DC voltage based on the voltage from the voltage source 20). As such, the power converter 12 supplies a load, such as the one or more inverters 18, a DC voltage 22. In certain embodiments, the one or more inverters 18 then convert the DC voltage 22 to an AC voltage to be supplied to one or more devices connected to the inverters 18, such as motors 24. The one or more inverters 18 may then, in turn, control the speed, torque, or other suitable operation of the one or more motors 24 by controlling the AC voltage provided to the motors 24. It should be understood that the industrial automation system may include one or more motor-drive systems 10, and each of the motor-drive systems 10 may include one or more additional components not depicted in FIG. 1.

The power converter 12 may include any suitable rectifier device that includes a number of switches that may be controlled, and may be of any suitable power converter. For example, the power converter 12 may be an active front end (AFE) converter, a diode converter, a thyristor converter, a diode front end rectifier, or the like. In some embodiments, the switches of the power converter 12 may be semiconductor-controlled devices, transistor-based (e.g., IGBT, metal-oxide semiconductor field-effect transistor (MOSFET), or other suitable transistor) devices, or other suitable devices in which the opening and/or closing of the switch may be controlled using an external signal (e.g., gate signal), which may be provided by the power converter control system 14. The power converter 12 may provide the DC voltage 22 (e.g., a regulated DC output voltage) on a direct current (DC) bus 25, which may be provided to the inverters 18 and may regenerate extra or additional power back to the voltage source 20. In this way, the power converter 12 may operate to maintain a unity power factor, generate a stable DC voltage (e.g., DC voltage 22) from the voltage source 20, control a power factor transmitted to the one or more inverters 18, or the like to generally control power supplied to the one or more inverters 18.

As discussed above, the power converter 12 may use the switching frequencies of the switches (e.g., power conversion devices) to convert the voltage from the voltage source 20 into the DC voltage 22. The DC voltage 22 may be generated across a resistor-capacitor (RC) circuit 26 including one or more resistors and one or more capacitors. In addition, the power converter control system 14 may control the operation of the power converter 12 to compensate for resonance, unknown line impedances, or the like.

In a similar manner to how the power converter control system 14 is tuned or programmed at least in part by an operator, the power converter 12 may include a grounding connection that may be installed at least in part by an operator after a time of manufacturing. Therefore, operation of the power converter 12 may be subject to installation variances. As described above, different motor and motor-drive configurations may use different types of grounding systems. Thus, efficiencies and performance of the power converter 12 may rely at least in part on the suitable installation by an operator of the appropriate grounding system. As will be appreciated, it may be desirable to have a universal grounding connection that enables the motor-drive system 10 to operate regardless of the type of grounding system or arrangement used.

Figure 2:
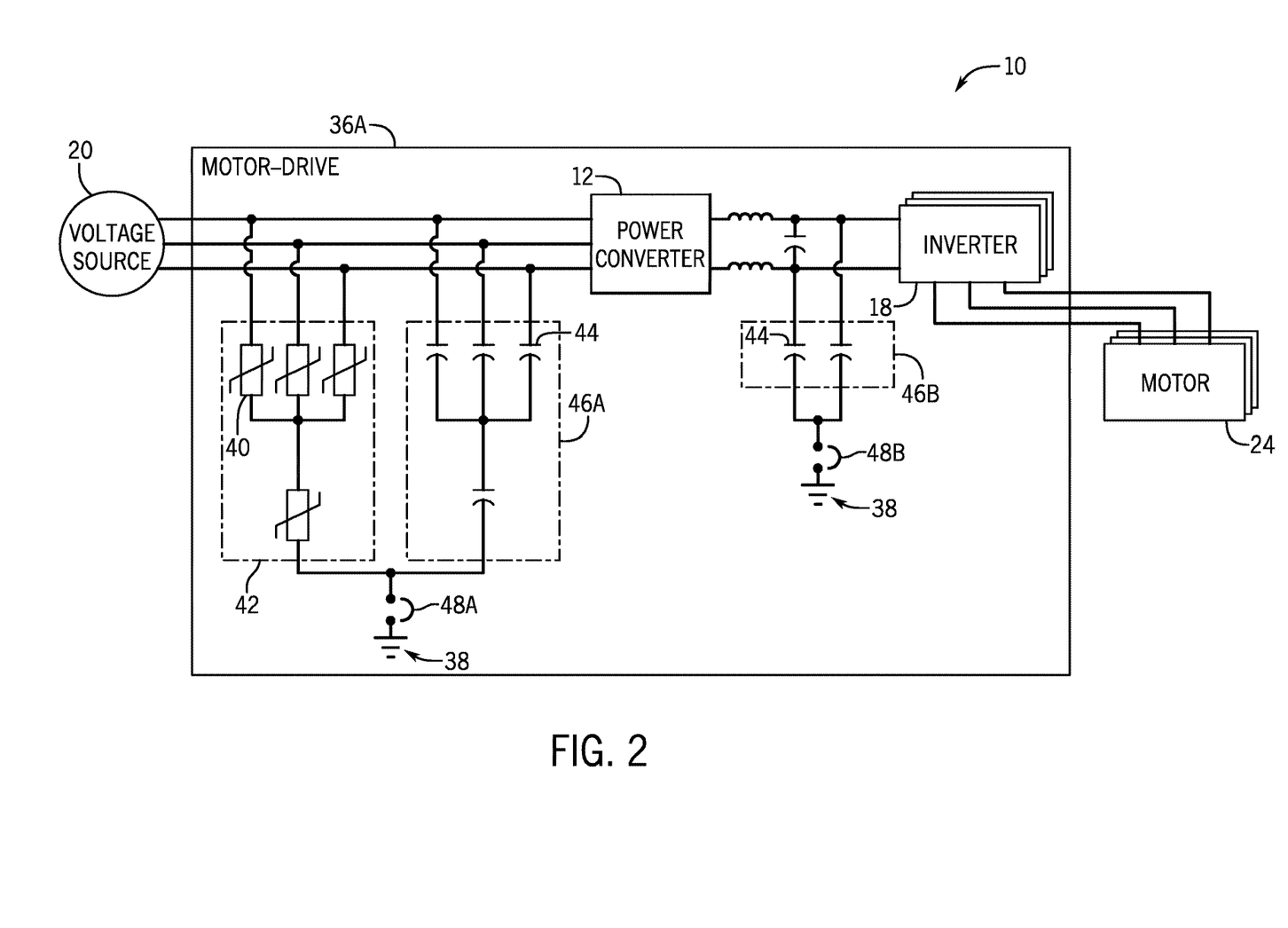
FIG. 2 is a block diagram of a motor-drive system that employs a first grounding configuration, in accordance with an embodiment.

To help elaborate, FIG. 2 is a block diagram of an example of the motor-drive system 10 that uses a motor-drive 36A with a first grounding configuration. The motor-drives 36 described within this disclosure may be any suitable motor-drive, such as a variable frequency drive (VFD). It should be understood that although not depicted as such, in some cases the DC bus 25 is coupled between the inverters 18 and the power converter 12 and/or the filter 16 is coupled between the voltage source 20 and the power converter 12. As depicted, the motor-drive 36A is coupled to the voltage source 20, which supplies voltage to the power converter 12 for conversion. The line-side of the power converter 12 is coupled to ground 38 via protective circuitry, such as one or more metal-oxide varistors (MOVs) 40 included in a metal-oxide varistors (MOV) assembly 42 and/or one or more electromagnetic compatibility (EMC) capacitors 44 included in an electromagnetic compatibility (EMC) capacitor assembly 46A (e.g., example EMI filter network). As illustrated in FIG. 2, the motor-drive 36A includes the EMC capacitor assembly 46A between the MOV assembly 42 and the power converter 12. The EMC capacitor assemblies 46 may be considered capacitor networks. The EMC capacitor assemblies 46 may help to protect the motor-drive system 10 from electromagnetic interference or the like. The load-side of the power converter 12 is coupled to the ground 38 via the EMC capacitors 44 included in an EMC capacitor assembly 46B (e.g., EMI filter network). Furthermore, the motor-drive 36A may include one or more inductors coupled between the power converter 12 and the EMC capacitor assembly 46B.

The MOV assembly 42, the EMC capacitor assembly 46A, and the EMC capacitor assembly 46B may be coupled to the ground 38 via jumpers 48 (e.g., 48A, 48B). The MOV assembly 42 and the EMC capacitor assembly 46A may share a jumper 48A. The EMC capacitor assembly 46B may be coupled to the ground 38 via the jumper 48B.

In some embodiments, the jumpers 48 are coupled in different arrangements than what is depicted in FIG. 2. For example, in wye-neutral grounded systems, both the jumpers 48 are desirable to be coupled to the ground 38 while in some systems, such as high-resistance grounded (HRG) systems, both the jumpers 48 are desirable to be decoupled from the ground 38. In this way, connection patterns associated with the jumper 48A and the jumper 48B are dependent at least in part on the configuration and/or arrangements of the motor-drive system 10, in addition to any standards and/or operating protocols that may be relevant to the motor-drive system 10 or the like. Since manufacturers of motor-drives (e.g., the motor-drive 36A) may not be present during installation and/or operation of the motor-drive 36A to verify installation or the arrangement of the jumpers 48, operation of the motor-drive 36A is dependent on an operator installing the jumpers 48 in a suitable manner. Installing the jumpers 48 incorrectly may cause pre-mature insulation aging, voltage ratings to be exceeded during operation, undetectable ground faults, or the like. As such, it may be desirable to use a motor-drive having a universal jumper configuration to increase a tolerance of the MOV assembly 42 to a variety of grounding configurations.

By way of example, the MOV assembly 42 should tolerate a variety of grounding systems, such that the respective MOVs 40 protect the respective circuit components of the motor-drive system 10 without compromising the enclosures of the MOVs 40. In some embodiments, the MOVs 40 employed in the MOV assembly 42 may include monitor circuits or components that enable a control system to be notified of an actuated MOV 40.

Figure 3:
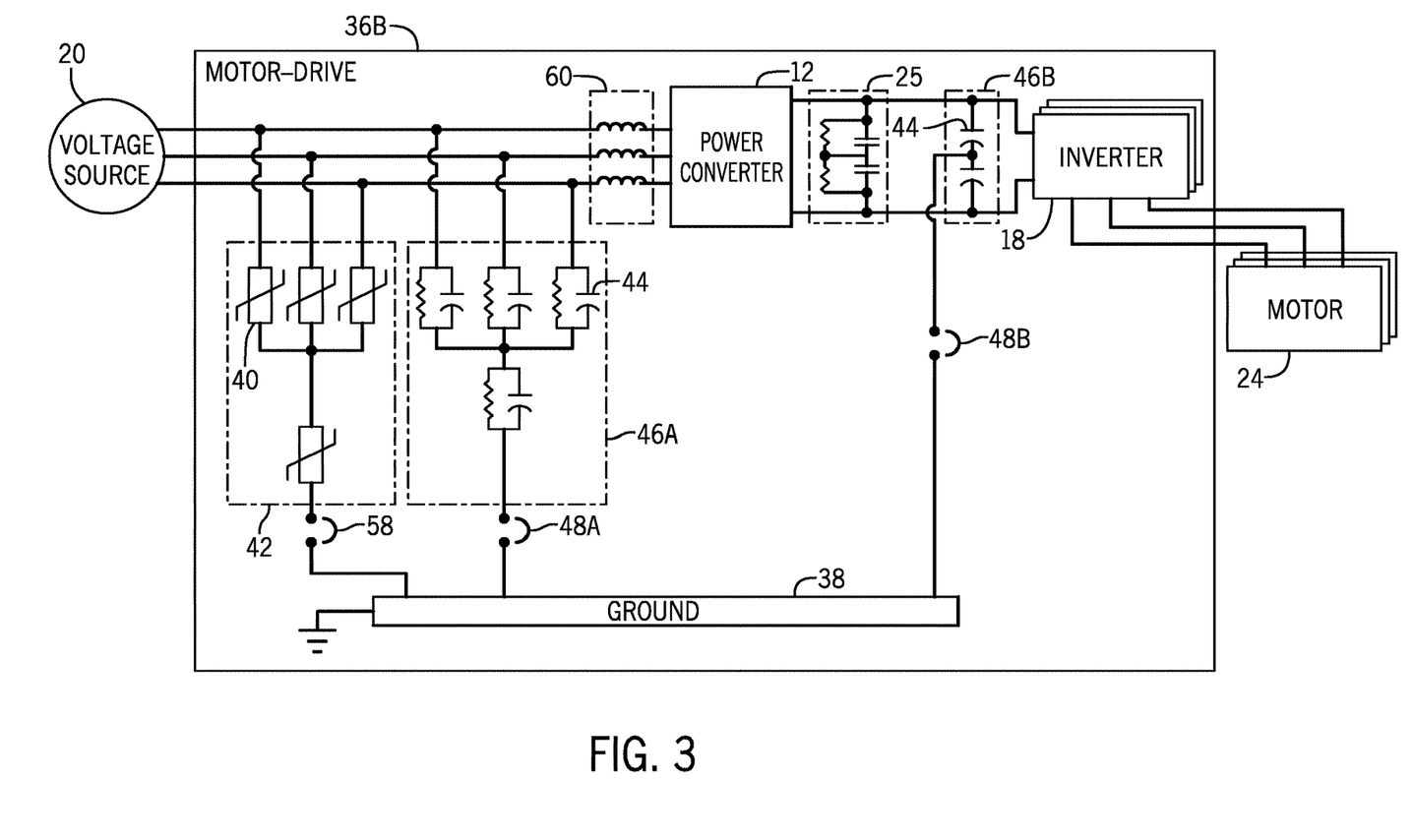
FIG. 3 is a block diagram of a motor-drive system that employs another grounding configuration associated with a universal grounding connection, in accordance with an embodiment.

With the foregoing in mind, FIG. 3 is a block diagram of an example of the motor-drive system 10 with a motor-drive 36B that uses a universal grounding configuration that may permit optional usage of the EMC capacitor assembly 46. This configuration depicted in FIG. 3 may permit the EMC capacitor assembly 46 to be coupled to the ground 38 to ensure compliance to certain regulations and/or EMC standards. In general, this configuration may permit the jumpers 48 to be left de-coupled from ground on various types of system grounding.

In this example, the MOV assembly 42 is coupled to the ground 38 via a permanent jumper 58 (e.g., a permanently-installed jumper) separate from the jumper 48A. The permanent jumper 58 may be used for factory verification tests on the power converter 12 and is not accessible by a customer at a time of installation into the motor-drive system 10. That is, after the motor-drive system 10 is manufactured, the permanent jumper 58 may be enclosed (e.g., surrounded) by sheet metal or other fabricated material (e.g., glass, plastic), such that an operator cannot physically access the permanent jumper 58. The EMC capacitor assembly 46A may be coupled to the ground 38 via the jumper 48A and the EMC capacitor assembly 46B may be coupled to the ground 38 via the jumper 48B. The jumpers 48 (e.g., 48A, 48B) may be herein understood to be removable jumpers since the jumpers 48 may be designed to be attachable and/or removable by an operator of the power converter 12. In addition, unlike the permanent jumper 58, which is enclosed to prevent access thereto by the operators, the jumpers 48 may be exposed (e.g., not enclosed) or accessible by an operator to touch, remove, or use tools to remove. For example, the jumpers 48 may be a screw in type connection or tool-less fastener which an operator can access after the motor-drive system 10 is manufactured. In other words, the operator does not have to remove any paneling or structure that encloses the jumper 48 to gain access to the jumpers 48 after the motor-drive system 10 has been manufactured.

As mentioned above, the permanent jumper 58, on the other hand, may be permanently installed between the MOV assembly 42 and the ground 38. For instance, the permanent jumper 58 may be fastened to the MOV assembly 42 and the ground 38 in such a way that the permanent jumper 58 is inaccessible by an operator and/or by using one or more fasteners that cannot be removed without using tools or physically breaking the permanent jumper 58. In some embodiments, the permanent jumper 58 may be a screw in type connection which an operator does not have access to at a time of installing the motor-drive system 10 at the respective site. Unlike the permanent jumper 58, the jumpers 48 may not couple the ground 38 and the EMC capacitor assemblies 46 at a time of installation into the motor-drive system 10. In some embodiments, an operator may determine that coupling of the EMC capacitor assemblies 46 to the ground 38 is desired based on the related regulations, the type of grounding system, or the like, and in these cases, the operator may opt to couple the EMC capacitor assembly 46 to the ground (e.g., such as when dictated by a regulatory standard). This coupling, however, remains optional to the operator.

In addition to using the permanent jumper 58 as described above, a line reactor 60 may be installed on a line-side of the power converter 12. Using this arrangement may protect the motor-drive system 10 against voltage surges, transients, unpredictable operating conditions associated with driving a motor via the motor-drive 36B, electromagnetic interferences, or the like because the motor-drive system 10 may be protected at least in part via the MOV assembly 42. Since the MOV assembly 42 is coupled separately to the ground 38, the MOV assembly 42 may provide independent protection to the motor-drive system 10.

In some embodiments, thermally protected MOVs 40 may be used within the MOV assembly 42. In some motor-drive systems 10, thermally protected MOVs 40 were not used because the thermally protected MOVs 40 were cost-prohibitive. As technology incorporated into the industrial automation space have longer lifespans, the corresponding motor-drive systems 10 have longer lifespans. As machines are able to operate with longer lifespans, operating the motor-drive system 10 in an overvoltage operation has become less desirable and less suitable of an operation, as it may decrease the lifespan of various components in the system. As such, using thermally protected MOVs 40 within the MOV assembly 42 to protect the motor-drive system 10 from harsh operating conditions (e.g., overvoltage, over DC voltage, abnormal operation, transients, or the like) may provide improved monitoring aspects of the operating lifespans of the components within the motor-drive system 10 and the like.

For example, as long as a MOV 40 is not overstressed and/or as long as a usable lifetime of the MOV 40 is not expired, the MOV 40 operates in circuits described here at or very close to ambient temperature. In situations when the MOV 40 (e.g., a non-thermally protected) is exposed to overvoltages, the MOV 40 operates by clamping the voltage (e.g., to protect the system). By operating in this manner, the MOV 40 may conduct a current that heats the circuitry of the MOV 40. If the temperature of the MOV 40 exceeds a thermal rating of the MOV 40, the MOV 40 may enter thermal runaway and overheat. This overheating may cause the MOV 40 to volatilely react. It is noted that the same overheating operation may happen if the MOV 40 reaches the end of its usable life, even if the motor-drive 36 is otherwise operating at intended (e.g., desirable) operating conditions.

A thermally protected MOV 40 includes one or more integrated fuses that open at a threshold temperature corresponding to the thermal rating, thus preventing the MOV 40 from volatilely reacting. This may protect the motor-drive 36 from damage and/or unsuitable operation. In some embodiments, voltage protection rating (VPR) of the thermally protected MOV 40 may be set relatively high since a motor-drive 36 may have a high rating for voltage to ground relative to line-line voltage (e.g., may reduce occurrence of overvoltage clamping). In addition, some thermally protected MOVs 40 provide facilities to detect the integrated fuse being open. This may be used to notify the user (e.g., via a control system) that drive surge protection of the motor-drive system 10 has opened and/or reached the end of its usable life, and that service is generally requested.

To elaborate, thermally protected MOVs 40 may include a temperature-sensitive fuse. The temperature-sensitive fuse of the thermally protected MOV 40 may cause the thermally protected MOV 40 to actuate (e.g., disable, open) in response to a temperature across the temperature-sensitive fuse that exceeds a temperature parameter of the thermally protected MOV 40. In this way, the MOV assembly 42 may protect the motor-drive system 10 from abnormal operating conditions that cause the thermally protected MOV 40 to detect an unsuitably high temperature (e.g., a temperature exceeding a preset temperature parameter of the thermally protected MOV 40). Furthermore, the MOV assembly 42 that employs thermally protected MOVs 40 may simultaneously protect the motor-drive system 10 from operating at voltages that exceed recommended levels for the motor-drive system 10 (e.g., operating in an overvoltage condition). In these embodiments, the MOVs 40 may also actuate in response to a voltage across the respective MOV 40 exceeding a particular threshold voltage parameter.

As described above, the MOV assembly 42 may be designed based at least in part on a particular thermal limit associated with operation of the motor-drive system 10. In this way, one or more of the MOVs 40 of the MOV assembly 42 may change state in response to detecting a particular temperature (e.g., exceeding a threshold), or temperature range. For example, a MOV 40 may be designed to have a particular trip point at a first temperature and designed not to actuate (e.g., break circuit) before detecting a temperature that exceeds the first temperature, and thus may be used to provide thermal protection. Thermal protection in this case may prevent thermal runaway of the MOV 40 and prevent a volatile breakdown of the MOV 40 that may follow a thermal runway of the MOV 40, where the volatile breakdown may cause damage to the rest of the power converter 12 and/or motor-drive system 10.

Furthermore, using this arrangement depicted in FIG. 3 may permit removal of capacitance internal to the power converter 12 (e.g., a snubber capacitor). The removal of a snubber capacitor of the power converter 12 may be due at least in part to the line reactor 60 and/or the EMC capacitor assembly 46A acting as a filter to reduce the effects of transient voltages (e.g., filter a portion of a transient voltage provided to the power converter 12) typically filtered by a snubber capacitor. In this example, the jumpers 48 may be optionally installed based at least in part on regulations, protocols, and/or when it is desirable to provide additional EMC protection.

Figure 4:
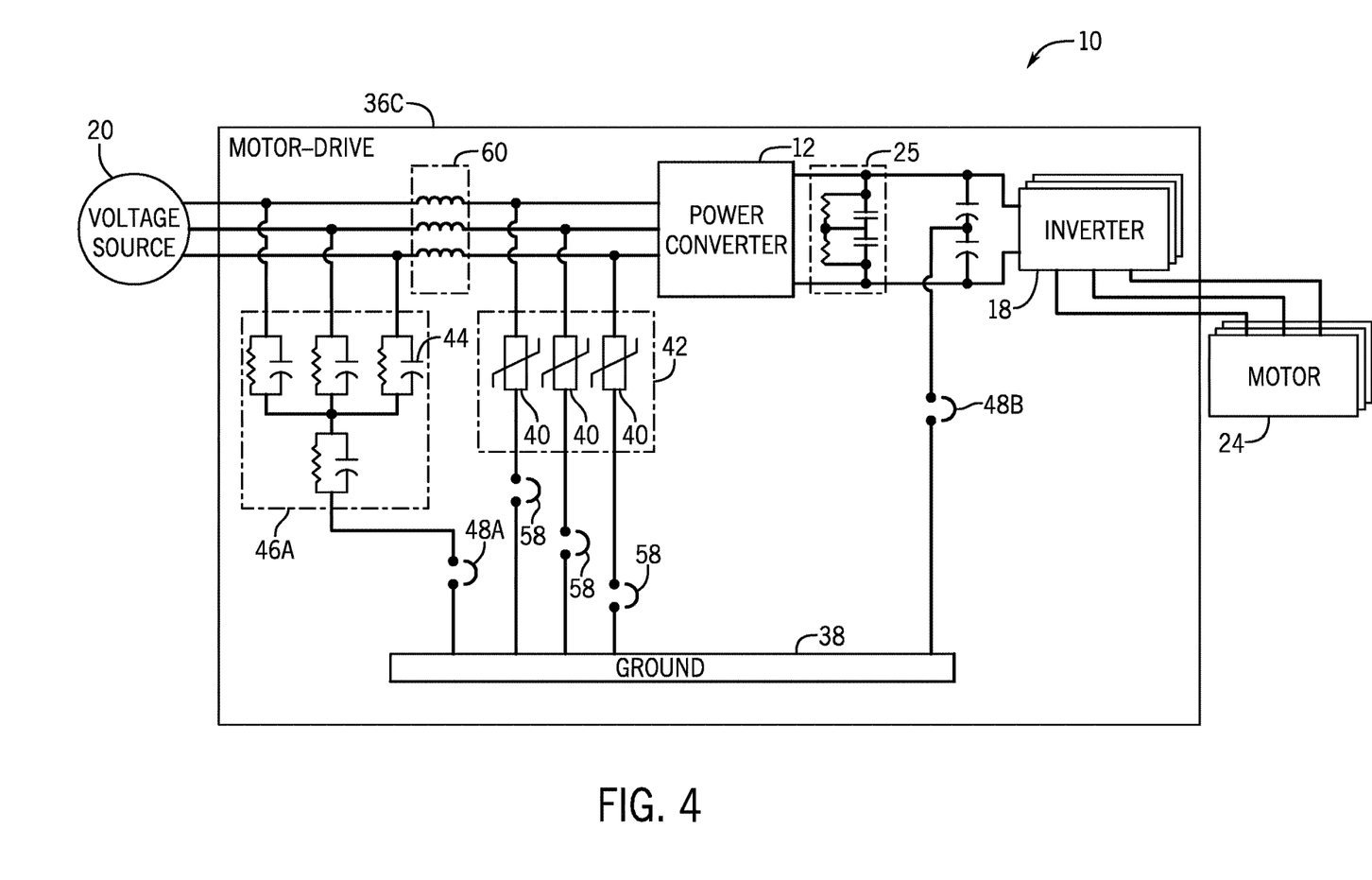
FIG. 4 is a block diagram of another example of the motor-drive system that employs yet another grounding configuration associated with the universal grounding connection, in accordance with an embodiment.

In the example depicted in FIG. 3, the line reactor 60 is provided between the EMC capacitor assembly 46A and the power converter 12. In some situations, it may be desirable to provide the line reactor 60 between the MOV assembly 42 and the EMC capacitor assembly 46A. This depicted configuration may result in improved protection and/or performance since at least line-line surge is attenuated by the line reactor 60. FIG. 4 is a block diagram of an example of the power converter 12 with a motor-drive 36C that uses another grounding configuration also associated with a universal grounding connection. As explained above, the power converter 12 includes the line reactor 60 between the MOV assembly 42 and the EMC capacitor assembly 46A. As may be apparent from comparing FIG. 3 to FIG. 4, a fewer number of MOVs 40 may be used to suitably protect the motor-drive system 10 when using the MOV assembly 42 and EMC capacitor assembly 46A arrangement of the motor-drive 36C (e.g., compare four MOVs 40 to three MOVs 40). This is possible because the line reactor 60 may be made to be surge tolerant, and thus provide protection to the motor-drive 36C from line-line surges. In this configuration, the MOV assembly 42 provides line-ground surge protection, permitting one MOV 40 to be removed from the MOV assembly 42. Thus, the motor-drive 36C may be a less expensive protective system to manufacture.

Figure 5:
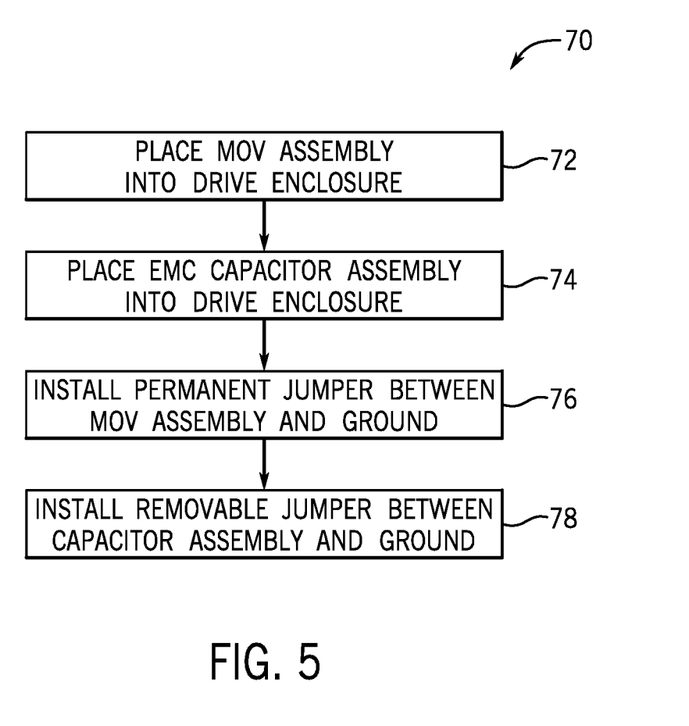
FIG. 5 is a method for grounding the motor-drive system of FIG. 1, in accordance with an embodiment.

FIG. 5 is a flowchart of a method 70 of manufacturing the motor-drive 36B and/or the motor-drive 36C. Although the following description of the method 70 is described in a particular order, it should be noted that the method 70 may be performed in any suitable order.

At block 72, the MOV assembly 42 may be placed into an enclosure of the motor-drive 36B and/or the motor-drive 36C. The MOV assembly 42 may be secured and/or coupled to components within the motor-drive 36B and/or the motor-drive 36C in a variety of suitable ways, including welding, mechanical couplings, or the like.

At block 74, the EMC capacitor assembly 46A and the EMC capacitor assembly 46B may be placed into the enclosure of the motor-drive 36B and/or the motor-drive 36C. The EMC capacitor assemblies 46 may be secured within the motor-drive 36B and/or the motor-drive 36C in a similar manner as the MOV assembly 42, using any suitable technique.

At block 76, the permanent jumper 58 may be installed into the enclosure of the motor-drive 36B and/or the motor-drive 36C. The permanent jumper 58 may couple the MOV assembly 42 to the ground 38 in a permanent or more secure manner, as described above. For example, after manufacturing of the motor-drive 36B and/or of the motor-drive 36C, the permanent jumper 58 is restricted or incapable of being removed, as described above. The permanent jumper 58 may be secured and/or coupled between the MOV assembly 42 and the ground 38 in a variety of suitable ways, including welding, mechanical couplings that are non-adjustable, non-removable, or otherwise permanent and unable to be changed by an operator, or the like. For example, the permanent jumper 58 may be attached via a welded joint or a bolted connection that is permanent (e.g., unable to be removed by an operator, not accessible after a time of manufacturing of the motor-drive 36B and/or motor-drive 36C). Furthermore, in some cases, the permanent jumper 58 may be enclosed in material that enables the permanent jumper 58 to be inaccessible by the operator, such as a material that surrounds (e.g., completely surrounds) termination points of the permanent jumper 58. For example, after manufacturing, the permanent jumper 58 may be enclosed (e.g., surrounded) by sheet metal or other fabricated material (e.g., glass, plastic), such that an operator cannot physically access the permanent jumper 58. In addition, in some embodiments, the permanent jumper 58 is coupled to a chassis of the motor-drive 36B and/or motor-drive 36C. The chassis may act as a system ground for the motor-drive 36B and/or motor-drive 36C or for components therein. In this way, the system ground may provide common electrical node that may be coupled to one or more components of the motor-drive 36B and/or motor-drive 36C (e.g., permanent jumper 58), such that when the motor-drive 36B and/or motor-drive 36C is installed in a facility or location, the operator may couple the system ground to a desired ground reference (e.g., a protective Earth ground, floating).

In some embodiments, tests may be performed on the motor-drive 36B and/or the motor-drive 36C while on a production line (e.g., during manufacturing). Some of these tests may be performed without the MOV assembly 42 and/or the EMC capacitor assembly 46 being coupled to the ground 38. After completion of these tests, the MOV assembly 42 may be coupled to the ground 38. As described above, the operator may couple the EMC capacitor assembly 46 to ground which is implicitly after a completion of these tests performed on the production line.

At block 78, the removable jumpers 48 may be installed into the enclosure of the power converter 12 and left decoupled. When an operator determines that it is desirable for the motor-drive 36 to have the removable jumpers 48 coupled to the EMC capacitor assemblies 46 (e.g., in response to regulatory standards), the operator (after a time of manufacturing) may opt to couple the removable jumpers 48 between the ground 38 and the EMC capacitor assemblies 46. The removable jumpers 48 may be secured and/or coupled between the EMC capacitor assemblies 46 and the ground 38 in a variety of suitable ways, including mechanical couplings that are adjustable, removable, or otherwise able to be changed by an operator (e.g., such as after installation into a motor-drive system 10), or the like. Upon installation of the MOV assembly 42, the EMC capacitor assemblies 46, the permanent jumpers 58, and the removable jumper 48, the motor-drive 36B and/or the motor-drive 36C may be shipped out to customers and installed in the motor-drive system 10.

In some embodiments, the motor-drive 36B and/or the motor-drive 36C may be used in a larger control system, such as a control system communicatively coupled to the power converter control system 14. Some of the MOVs 40 may include a monitoring lead that transmits a signal indicative of the state of the MOV 40. In these embodiments, the method 70 may include communicatively coupling the control system associated with the motor-drive system 10, the motor-drive 36B, and/or the motor-drive 36C to the MOV assembly 42. The control system may identify when one or more of the MOVs (e.g., thermally protected MOVs 40, resettable thermally protected MOVs 40) have actuated based at least in part on a signal provided from the MOV assembly 42.

To elaborate, the power converter control system 14, or other suitable monitoring circuitry, may couple to one or more of the MOVs 40, which may include a monitoring lead. A signal may be transmitted by the MOV 40 that corresponds to a state of the MOV 40. For example, if the MOV 40 is in a first state (e.g., closed, normal operation), a first control signal may be transmitted via the monitoring lead. However, while the MOV 40 is in a second state (e.g., open, abnormal operation in response to detecting a high temperature), a second control signal may be transmitted via the monitoring lead. In some embodiments, the first control signal (or second control signal) may correspond to a signal, while the second control signal (or first control signal) may correspond to a lack of the signal, or no signal. The power converter control system 14 and/or larger control system of the motor-drive system 10 may react to, or perform an operation in response to, detection of a signal (or lack thereof) from the monitoring lead. In this way, actuation of one or more MOVs 40 within the MOV assembly 42 may cause an operation to happen associated with the motor-drive system 10. The operation may include one or more operations associated with the motor-drive system 10 including a power-off or power on operation, an operation associated with decreasing a speed of the motor 24, an operation associated with increasing a speed of the motor 24, an operation to change a switching frequency of the power converter 12, an operation to change a torque of the motor 24, an alarm operation, or the like. In this way, the operation may include any suitable decrease, increase, or change in voltage, current, frequencies, or the like of one or more electrical signals supplied to one or more components of the motor-drive system 10. For example, an alarm may be initiated by the power converter control system 14 in response to detecting a control signal from the monitoring lead that indicates an abnormal operation (e.g., detection of a high temperature).

Technical effects of the present disclosure include techniques for protecting a power converter abnormal operation, transients, overvoltage, or the like. The power converter may include an MOV assembly permanently coupled to ground via a permanent jumper. The MOV assembly may be provided and coupled to ground independent of one or more EMC capacitor assemblies of the power converter. Providing the MOV assembly independent of the one or more EMC capacitor assemblies enable the MOV assembly to protect against abnormal operation from an incorrectly and/or unsuitably installed EMC capacitor assembly. Including the components described herein may permit more robust operation of the power converter that depends less on suitable installation by an operator after manufacturing.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A motor-drive system, comprising:
 a power converter configured to generate a direct current (DC) voltage based on three voltages received from three supply voltage lines via a voltage source;
 a metal-oxide varistor (MOV) assembly comprising four metal-oxide varistors (MOVs), wherein three MOVs of the MOV assembly are configured to respectively couple to the three supply voltage lines, wherein the MOV assembly is configured to couple between the voltage source and the power converter;
 an electromagnetic compatibility (EMC) capacitor assembly coupled between the voltage source and the power converter;
 a permanently-installed jumper configured to couple a fourth MOV of the MOV assembly to a system ground via a welded joint connection, wherein each of the three MOVs is configured to couple between the fourth MOV and a respective voltage supply line of the three supply voltage lines;

a housing configured to enclose the permanently-installed jumper and render the permanently-installed jumper inaccessible from outside the housing; and a removable jumper configured to couple the EMC capacitor assembly to the system ground, wherein the removable jumper is exposed outside the housing.

2. The motor-drive system of claim 1, wherein the EMC capacitor assembly comprises a plurality of EMC capacitors coupled in parallel with respective resistors of a plurality of resistors of the motor-drive system.

3. The motor-drive system of claim 1, comprising a line reactor coupled between the voltage source and the power converter.

4. The motor-drive system of claim 3, wherein the EMC capacitor assembly is configured to couple between the voltage source and the line reactor.

5. The motor-drive system of claim 1, comprising an inverter configured to convert the DC voltage to an alternating current (AC) voltage, wherein the AC voltage is provided to a load of the motor-drive system.

6. The motor-drive system of claim 5, comprising a DC bus coupled between the power converter and the inverter.

7. The motor-drive system of claim 1, comprising one or more inductances coupled between the power converter and the EMC capacitor assembly.

8. The motor-drive system of claim 1, comprising a control system communicatively coupled to the MOV assembly, wherein the control system is configured to:

detect one or more of the four MOVs being disabled; and change an operation of the power converter in response to detecting the one or more of the four MOVs being disabled.

9. The motor-drive system of claim 8, wherein the operation comprises a voltage, a current, a torque, a switching frequency, or any combination thereof associated with the power converter or a load of an inverter.

10. The motor-drive system of claim 1, wherein each of the four MOVs comprise one or more integrated fuses configured to change state at a temperature threshold.

11. A motor-drive system, comprising:

a power converter configured to generate a direct current (DC) voltage based on three voltages received from three supply voltage lines via a voltage source a metal-oxide varistor (MOV) assembly comprising three metal-oxide varistors (MOVs) configured to respectively couple to the three supply voltage lines, wherein the MOV assembly is configured to couple between the voltage source and the power converter;

an electromagnetic compatibility (EMC) capacitor assembly coupled between the voltage source and the power converter;

a plurality of permanent jumpers configured to respectively couple each of the three MOVs to a system ground;

a housing configured to enclose each of the plurality of permanent jumpers and render each of the plurality of permanent jumpers inaccessible from outside the housing; and a removable jumper configured to couple the EMC capacitor assembly to the system ground, wherein the removable jumper is exposed outside the housing.

12. The motor-drive system of claim 11, comprising a control system communicatively coupled to the MOV assembly, wherein the control system is configured to:

detect a state change of at least one of the three MOVs; and change an operation of the power converter in response to detecting the state change of the at least one of the three MOVs.

13. The motor-drive system of claim 12, wherein the operation comprises a voltage, a current, a torque, a switching frequency, or any combination thereof associated with the power converter, a load of the power converter, or both.

14. The motor-drive system of claim 11, wherein the MOV assembly is configured to disconnect the voltage source from the power converter in response to detecting a temperature that exceeds a temperature threshold associated with one or more of the three MOVs.

15. The motor-drive system of claim 11, wherein each of the three MOVs comprise one or more integrated fuses configured to change state at a temperature threshold.

16. The motor-drive system of claim 11, comprising a line reactor disposed between a first set of couplings and a second set of couplings, wherein the first set of couplings is configured to couple the three MOVs respectively to the three supply voltage lines, and wherein the second set of couplings is configured to couple a plurality of EMC capacitors of the EMC capacitor assembly respectively to the three supply voltage lines.

17. The motor-drive system of claim 11, wherein the plurality of permanent jumpers is configured to respectively couple each of the three MOVs to the system ground via respective welded joint connections.

18. A method, comprising:

placing a metal-oxide varistor (MOV) assembly into a drive enclosure, wherein the MOV assembly comprises three metal-oxide varistors (MOVs) that respectively couple to three supply lines, wherein the MOV assembly couples between a voltage source configured to provide three voltages and a power converter, wherein each of the three supply lines transmits a respective voltage of the three voltages to the power converter;

placing an electromagnetic compatibility (EMC) capacitor assembly into the drive enclosure;

coupling a plurality of permanent jumpers between the MOV assembly and a system ground such that each of the three supply lines respectively couple to the system ground via the three MOVs, wherein each of the plurality of permanent jumpers is enclosed by a housing that renders each of the plurality of permanent jumpers inaccessible from outside the housing; and coupling a removable jumper between the EMC capacitor assembly and the system ground such that each of the three supply lines respectively couple to the system ground via the EMC capacitor assembly, wherein the removable jumper is exposed outside the housing.

19. The method of claim 18, comprising communicatively coupling a control system associated with a motor-drive system to the MOV assembly, wherein the control system is configured to identify when one or more thermally protected metal-oxide varistors (MOVs) of the MOV assembly have disabled based at least in part on a signal provided via the MOV assembly.

20. The method of claim 18, comprising coupling the plurality of permanent jumpers between the MOV assembly and the system ground via respective welded joint connections.

* * * * *